(12) United States Patent
Glebov et al.

(10) Patent No.: US 7,424,185 B2
(45) Date of Patent: Sep. 9, 2008

(54) STRETCHING AND COMPRESSION OF LASER PULSES BY MEANS OF HIGH EFFICIENCY VOLUME DIFFRACTIVE GRATINGS WITH VARIABLE PERIODS IN PHOTO-THERMO-REFRACTIVE GLASS

(75) Inventors: Leonid B Glebov, Orlando, FL (US); Emilie Flecher, Grussenheim (FR); Vadim I. Smirnov, Orlando, FL (US); Almantas Galvanauskas, Ann Arbor, MI (US); Kai-Hsiu Liao, Ann Arbor, MI (US)

(73) Assignees: University of Central Florida Research Foundation, Inc., Orlando, FL (US); University of Michigan, Ann Arbor, MI (US)

( * ) Notice: Subject to any disclaimer, the term of this patent is extended or adjusted under 35 U.S.C. 154(b) by 0 days.

(21) Appl. No.: 11/316,231

(22) Filed: Dec. 22, 2005

(65) Prior Publication Data
US 2006/0221449 A1   Oct. 5, 2006

Related U.S. Application Data

(63) Continuation-in-part of application No. 11/261,077, filed on Oct. 28, 2005, which is a continuation-in-part of application No. 10/665,339, filed on Sep. 19, 2003, now Pat. No. 7,326,500, which is a continuation-in-part of application No. 09/750,708, filed on Dec. 28, 2000, now Pat. No. 6,673,497, which is a continuation-in-part of application No. 09/648,293, filed on Aug. 24, 2000, now Pat. No. 6,586,141.

(51) Int. Cl.
*G02B 6/34* (2006.01)
*H01S 3/10* (2006.01)
*H01S 3/30* (2006.01)
*G03H 1/04* (2006.01)

(52) U.S. Cl. ............................. 385/37; 372/5; 372/25; 372/30; 430/1; 430/2; 359/1; 359/25

(58) Field of Classification Search .................. None
See application file for complete search history.

(56) References Cited

U.S. PATENT DOCUMENTS 4,541,694 A    9/1985    Sullivan et al. ............ 350/371

(Continued)

OTHER PUBLICATIONS (1979) A.P. Gararin, L.B. Glebov, O.M. Efimov, O.S. Efimova, "Formation of color center in sodium calcium silicate glasses with the nonlinear absorption of powerful UV radiation," Sov. J. Glass Phys. Chem., 5, pp. 337-340.

(Continued)

*Primary Examiner*—Tina M Wong
(74) *Attorney, Agent, or Firm*—Brian S. Steinberger; Phyllis K. Wood; Law Offices of Brian S. Steinberger, P.A.

(57) ABSTRACT

High efficiency reflective volume Bragg gratings with chirped gratings recorded in photo-thermo-refractive glass having an absolute diffraction efficiency exceeding 95% in transmitting and reflecting modes are used to stretch and/or compress ultrashort laser pulses with high efficiency. Robustness, compactness, thermal and laser stability along with placement of multiple elements in the same space provides femtosecond laser system with high efficiency of stretching and re-compression of femtosecond pulses.

10 Claims, 4 Drawing Sheets

U.S. PATENT DOCUMENTS

| | | | | |
|---|---|---|---|---|
| 5,098,803 | A | 3/1992 | Monroe et al. | 430/1 |
| 5,339,305 | A | 8/1994 | Curtis et al. | 469/112 |
| 5,499,134 | A | 3/1996 | Galvanauskas et al. | 359/333 |
| 6,586,141 | B1 | 7/2003 | Efimov et al. | 430/1 |
| 6,673,497 | B2 | 6/2004 | Efimov et al. | 430/1 |
| 6,917,631 | B2* | 7/2005 | Richardson et al. | 372/5 |
| 2002/0045104 | A1* | 4/2002 | Efimov et al. | 430/2 |
| 2003/0189959 | A1* | 10/2003 | Erbert et al. | 372/25 |

OTHER PUBLICATIONS (Aug. 1988) IBM Tech. Discl. Bull., vol. 31(3), pp. 18-23.

(1996) P. Hariharan, Optical Holography, Principles, techniques and applications, Chapter 7: "Practical recording materials," 95-124, Cambridge University Press, pp. 95-97.

(1997) A.V. Dotsenko, L.B. Glebov, V.A. Tsekhomsky, "Physics and Chemistry of Photochromic Glasses," CRC Press, Boca Raton, NY., pp. 9-11.

(1999) Efimov, et al. "Laser-induced Damage of Photo-Termo-Refractive Glasses for Optical-Holographic-Element Writing," SPIE vol. 3578, pp. 564-575.

(1999) O.M. Efimov, L.B. Glebov, S. Grantham, M. Richardson, "Photoionization of silicate glasses exposed to IR femtosecond pulses," Journal of Non-Crystalline Solids, 253, pp. 58-67.

(2002) O.M. Efimov, L.B. Glebov, H.P. Andre, Measurement of the induced refractive index in a potothermorefractive glass by a liquid-call shearing interferometer, Appl. Optics, 41., pp. 1864-1871.

Seunghoon Han, Bong-Ahn Yu, Seunghwan Chung, Hwi Kim, Jungwook Paek, and Byoungho Lee,Filter characteristics of a chirped volume holographic grating, Optics Letters 29, 107 (2004).

A. Galvanauskas, M. E. Ferrnann, D. Harter, K. Sudgen, and I. Bennion. All fiber femtosecond pulse amplification circuit using chirped Bragg gratings. Appl. Phys. Lett. 66 (1995) 1053.

A. Galvanauskas, D. Harter, S. Radic, and G.P. Agrawal, High-energy femtosecond pulse compression in chirped fiber gratings, in Conference on Lasers and Electro-Optics, vol. 9, 1996 OSA Technical Digest Series (Optical Society of American, Washington, D.C., 1996), pp. 499 500.

A. Galvanauskas, A. Heaney, T. Erdogan, D. Harter, Use of volume chirped Bragg gratings for compact high-energy chirped pulse amplification circuits, in Conference on Lasers and Electro-Optics, vol. 6, 1998 OSA Technical Digest Series (Optical Society of American, Washington, D.C., 1998), p. 362.

C.M. Gonzalez Inchauspe, O. E. Martinez. Aberration compensation of a B 14 (1997) 2696.

G. Lenz, K. Tamura, H. A. Haus and E. P. Ippen. All-solid-state femtosecond source at 1.55 um, Opt Lett. 20 (1995).

J. Limbert, T. Schreiber, T. Clausnitzer, K. Zollner, H-J. Fuchs, E. B. Kley, H.Zellmer, A. Tunnermann. High-power femtosecond Yb-doped fiber amplifier. Optc Expr 10 (2002).

Terrance J. Kessler, Joachim Bunkenburg, Hu Huang, Alexei Kozlov, David D. Meyerhofer. Demonstration of coherent additio! n of multiple gratings for high-energy chirped-pulse-amplified lasers. Optics Letters 29 (2004) 635-637.

* cited by examiner ns and positions of side lobes are
STRETCHING AND COMPRESSION OF LASER PULSES BY MEANS OF HIGH EFFICIENCY VOLUME DIFFRACTIVE GRATINGS WITH VARIABLE PERIODS IN PHOTO-THERMO-REFRACTIVE GLASS This application is a continuation-in-part of U.S. patent application Ser. No. 11/261,077 filed on Oct. 28, 2005 which is a continuation-in-part of U.S. patent application Ser. No. 10/665,339 filed on Sept. 19, 2003, now U.S. Pat. Ser. No. 7,326,500, which is a continuation-in-part of U.S. patent application Ser. No. 09/750,708 filed on Dec. 28, 2000, now U.S. Patent No. 6,673,497, which is a continuation-in-part of U.S. patent Ser. No. 09/648,293 filed on Aug. 24, 2000, now U.S. Pat. Ser. No. 6,586,141 which further claim priority from U.S. Provisional Application Ser. No. 60/174,432 filed Jan. 4, 2000 and which was funded by the Ballistic Missile Defense Organization Contract 66001-97-C60008 and claims the benefit of priority to U.S. Provisional Application Ser. No. 60/646,297 filed on Jan. 24, 2005 and was funded in part by DoD/DARPA Contract No. HR-01-1041-0004.

FIELD OF THE INVENTION

This invention relates to diffractive optical elements and more specifically those diffractive optical elements produced from photosensitivity photo-thermo-refractive (PTR) glass with diffractive efficiency exceeding 95% and their use as variable period (chirped gratings) for stretching and compression of laser pulses.

BACKGROUND AND PRIOR ART

U.S. Pat. Nos. 6,586,141 and 6,673,497 and summarizing publication L. B. Glebov, V. I. Smimov, C. M. Stickley, I. V. Ciapurin, New approach to robust optics for HEL systems, Laser Weapons Technology III, Proceedings of SPIE, 4724 (2002) pp. 101-109 teach how to make diffractive optical elements from photosensitivity photo-thermo-refractive (PTR) glass with efficiency exceeding 95%.

These diffractive optical elements are used as spatial filters, attenuators, beam splitters, beam sampler, beam deflector controlled by angular positioning of grating or spectral scanning of the incident beam, selector of particular wavelengths, also known as notch filter or add/drop element, spectral shape former, also known as gain equalizer, spectral sensor, also known as wavelocker or wavelength meter, angular sensor, also known as angular pointer, Bragg spectrometer, also known as spectral analyzer, and selectors of transverse and longitudinal modes in laser resonators. All these diffractive optical elements are based on the use of specific angular and spectral selectivity of Bragg gratings.

A basic theory of such gratings was developed by H. Kogelnik, as described in "Coupled wave theory for thick hologram gratings", Bell System Tech. J. 48, (1969), pp. 2909-2945 and was used in the U.S. Pat. Nos. 6,586,141 and 6,673,497 (previously cited) for modeling of spectral and angular selectivity of both reflecting and transmitting gratings. It was shown that spectral and angular selectivity of Bragg gratings could be controlled by proper selection of their basic parameters which include spatial frequency, refractive index modulation, and thickness. The range of variations of Bragg gratings parameters (spectral or angular selectivity) is very wide and covers most of the requirements of different optical and laser systems. However, the shape of the element is predetermined by the periodical modulation of a refractive index. Thus, the relatively narrow top of a selectivity function and the presence and positions of side lobes are usually considered as intrinsic drawbacks of volume Bragg gratings that could not be avoided.

Chirped gratings with variable period, or spatial frequency, are well known in optical science and are widely used for spectral filtering and analysis. However, the main part of the chirped gratings is made in fiber geometry. Chirped gratings were used for narrow band spectral filtering as disclosed in Songyang Li, Nam Quoc Ngo, Swee Chuan Tjin and Le Nguyen Binh, "Tunable and switchable optical bandpass filters using a single linearly chirped fiber Bragg grating," In press Optics Communications, (2004). The chirped gratings were also used for laser wavelength stabilization and dispersion compensation as described in Xiaoke Yi, Chao Lu, Xiufeng Yang, Wen-De Zhong, Fang Wei, and Yixin Wang, High-birefringence linearly chirped grating based optical device for PMD, Opt. Expr. 11, (2003) p. 2634; in Pei Li, Jian Shuisheng, Yan Fengping, Ning Tigang and Wang Zhi, Long-haul WDM system through conventional single mode optical fiber with dispersion compensation by chirped fiber Bragg grating, Optics Communications 222, (2003) p. 169; for gain flattening as described in Audrey Elisa Lobo, James A. Besley, and C. Martin de Sterke, Gain-Flattening Filter Design Using Rotationally Symmetric Crossed Gratings, Journal of Lightwave Technology 21, (2003) p. 2084; for equalizing gain as described in Martin Guy, and Francois Trépanier, Chirped Fiber Bragg Gratings Equalize Gain, Laser Focus World, Supplement issue, (2001), p. 77 and multi-wavelength signal demultiplexing as described in E. Simova, M. Kavehrad and K. Stoev, Wavelength demultiplexing by chirped waveguide gratings, Optics Communications 134, (1997) p. 330.

An example of the use of volume chirped grating recorded in $Fe:LiNbO_3$ for side lobes suppression in spectral filters described in Seunghoon Han, Bong-Ahn Yu, Seunghwan Chung, Hwi Kim, Jungwook Paek, and Byoungho Lee, Filter characteristics of a chirped volume holographic grating, Optics Letters 29, (2004) p. 107. The use of volume chirped gratings is restricted by the lack of available photosensitive materials which provide high sensitivity, low losses, and stability of volume in the processes of exposure and development. The last feature is extremely important for chirped gratings because of necessity for precise control of spatial distribution of grating period.

It is important to note that modeling of gratings with variable period is difficult with the use of conventional Kogelnik's theory of coupled waves. This is why matrix approach disclosed in S. Huang, M. LeBlanc, M. M. Ohn, and R. M. Measures, Bragg interrogating structural sensing, Appl. Opt. 34, (1995) p. 5003 and in Gabriel Cormier, Roger Boudreau, and Sylvain Thériault. Real-coded genetic algorithm for Bragg grating parameter synthesis, J. Opt. Soc Am. B 18, (2001) p. 1771 was used for modeling of chirped gratings.

Recent advance in laser aided material processing causes increased demands on high peak power femtosecond lasers. The use of chirped gratings for stretching and compression of femtosecond laser pulses allows increasing of pulse energy. The most contact design of femtosecond laser is based on all fiber geometry, where chirped fiber gratings are used to compress and decompress pulses A. Galvanauskas, M. E. Fermann, D. Harter, K. Sudgen, and I. Bennion, All fiber femtosecond pulse amplification circuit using chirped Bragg gratings. Appl. Phys. Lett. 66 (1995) 1053. One of the advantages of chirped fiber gratings for this use is that you can obtain good beam quality especially when identical gratings are used for the compression and the decompression. This allows the output beam to be more identical to the input beam, considering the shape for instance.

One of the drawbacks of chirped fiber gratings is that those fibers cannot tolerate high power density which is necessary for high power amplification. This limitation is due to the small aperture resulted in high power density and, therefore, in low damage threshold of fibers. The best pulse energy that so far has been obtained for all-fiber femtosecond system is <100 nJ A. Galvanauskas, D. Harter, S. Radic, and G. P. Agrawal, High-energy femtosecond pulse compression in chirped fiber gratings, in Conference on Lasers and Electro-Optics, Vol. 9, 1996 OSA Technical Digest Series (Optical Society of America, Washington, D.C., 1996), pp 499-500.

Higher energies can only be achieved by means of a system of gratings or prisms that are added to recompress the pulses, which seriously enhance complexity of laser systems as described in C. M. Gonzalez Inchauspe, O. E. Mart nez, Aberration compensation of a curved diffraction grating stretcher for femtosecond chirped-pulse amplification. JOSA B 14 (1997) p. 2696 and in G. Lenz, K. Tamura, H. A. Haus and E. P. Ippen, All-solid-state femtosecond source at 1.55 um. Opt Lett. 20 (1995). Another disadvantage of such high requirements for alignment of surface grating and other optical elements in compression blocks like telescopes lenses, complicated mirrors that are needed as disclosed in J. Limbert, T. Schreiber, T. Clausnitzer, K. Zollner, H-J. Fuchs, E.-B. Kley, H. Zellmer, A. Tunnermann, High-power femtosecond Yb-doped fiber amplifier. Optc Expr 10 (2002). Small alignment errors in the positioning of all these elements can cause frequency dispersion as described in Terrance J. Kessler, Joachim Bunkenburg, Hu Huang, Alexei Kozlov, David D. Meyerhofer, Demonstration of coherent addition of multiple gratings for high-energy chirped-pulse-amplified lasers. Optics Letters 29 (2004) pp. 635-637. Moreover, those systems cannot be compact because of large distance needed between the two gratings or prisms used for compression. A limiting factor of surface diffraction gratings is their low optical damage threshold (2 J/cm2 in 1 ns pulse) which results in very large apertures in the range of tens of centimeters. However, manufacturing of large aperture gratings is challenging, so instead of one large coherent addition of several gratings can be used as disclosed in G. P. Agrawal, Nonlinear Fiber Optics, Academic, San Diego, Calif., 1995. It makes such technology extremely complicated and expensive.

Another serious limitation of surface-diffraction-grating compressors is associated with the restricted average-power handling capacity. Existing diffraction-grating compressors have not been able to tolerate more than 100-W of average power, with tens of watts being a typical limit. With fiber laser power exceeding 1-k level, this limitation is becoming the main hindrance on the path of power scaling of ultrashort-pulse laser technology.

Previously, solution of reducing complexity of CPA arrangement through the use of chirped volume Bragg gratings have been proposed, in order to overcome limited mode-area of chirped fiber Bragg grating compressors as disclosed in U.S. Pat. No. 5,499,134 issue on Mar. 12, 1996 to Galvanauskas et al,. However, no suitable method of achieving chirped volume gratings have been identified there. In fact, experimental attempt to implement such gratings through UV-written photosensitive-glass gratings identified main difficulty of achieving required performance as described in A. Galvanauskas, A. Heaney, T. Erdogan, D. Harter, Use of volume chirped Bragg gratings for compact high-energy chirped pulse amplification circuits, in Conference on Lasers and Electro-Optics, vol. 6, 1998 OSA Technical Digest Series (Optical Society of America, Washington, D.C., 1998), p. 362. It was demonstrated that due to the exponential decay of the writing-UV-beam intensity (due to writing-beam absorption during writing process) the resulting gratings are highly inhomogeneous in the depth direction, producing highly spatially distorted pulse-compressed beams. This, on one hand, severely limits the attainable volume-grating aperture size to no more than 100-300 um, and on the other hand, produces unacceptable beam quality loss.

Thus, the main approach of the proposed invention is a combination of properties of high efficiency volume Bragg gratings in PTR glass, which allow achieving very large sizes (tens of millimeters) of both transverse apertures and in depth direction with highly homogenous spatial grating profile, and ideology of stretching and compression of short pulses for power amplification by chirped fiber gratings.

Unique properties of gratings recorded inside PTR glass enable creation of very large apertures with homogeneous transverse spatial profile, thus eliminating any significant beam distortions and allowing to scale pulse energies into multi-mJ energy range and higher. Furthermore, intrinsic ability of PTR glass to withstand high average laser powers (our recent tests indicated no damage for 0.5-kW laser power focused into 350-um diameter spot in PTR glass) provides with unique method of implementing high power (from 100 W to multi-kilowatt level) femtosecond technology, which has not been attainable with any other previously demonstrated compressor technology.

SUMMARY OF THE INVENTION

The first objective of the present invention is to provide apparatus, methods, systems and devices for a new generation of high power femtosecond lasers systems with high efficiency.

The second objective of the present invention is to provide apparatus, methods, systems and devices for fabricating strechers and compressors for short and ultrashort laser pulses by recording of high efficiency volume gratings with variable period (chirped) in PTR glass.

The third objective of the present invention is to provide apparatus, methods, systems and devices for high power femtosecond lasers with high laser-induced damage threshold and protection from misalignment.

The fourth objective of the present invention is to provide apparatus, methods, systems and devices for increasing the power of high power femtosecond lasers while decreasing the size and weight of the laser.

The fifth objective of the present invention is to provide apparatus, methods, systems and devices for increasing the efficiency of stretching and compression to approximately 95%.

The sixth objective of the present invention is to provide apparatus, methods, systems and devices for stretching and compression of short laser pulses for power amplification.

The seventh objective of the present invention is to provide apparatus, methods, systems and devices to enable creation of very large apertures with homogeneous transverse spatial profile to eliminate significant beam distortions.

The preferred embodiment of the invention is a diffractive optical element from a photo-thermal-diffractive element having an absolute diffraction efficiency exceeding 95% with chirped Bragg gratings recorded in the photo-thermal-diffractive element for stretching and compressing of short laser pulses with high efficiency for power amplification. The chirped Bragg gratings include plural Bragg grating with a spatial chirp, the spatial chirp grating period varies along a spatial axis for broadening of spectral width and decreasing spectral selectively side lobes for fine spectral filtering. A laser beam having short laser pulses is directed from a one side to the other side of the diffractive optical element for stretching the short laser pulses. The laser beam is passed through the diffractive optical element in the opposite direction for compression of the short laser pulses. In an embodiment, the diffractive optical element is used with a femtosecond laser having ultrashort laser pulse output for stretching and compressing of the ultrashort laser pulses for power amplification with a high laser-induced damage threshold and protection from misalignment.

Further objectives and advantages of this invention will be apparent from the following detailed description of the presently preferred embodiments which are disclosed in the following text and properties of which are illustrated in the accompanying drawings.

BRIEF DESCRIPTION OF THE FIGURES

FIG. 1b shows the spatial coordinate when the grating varies along the spatial axis as shown in FIG. 1a.

DESCRIPTION OF THE INVENTION

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A serious limitation of surface-diffraction-grating compressors is associated with the restricted average-power handling capacity. Existing diffraction-grating compressors have not been able to tolerate more than 100-W of average power, with tens of watts being a typical limit. With fiber laser power exceeding 1-kW level, this limitation is becoming the main hindrance on the path of power scaling of ultrashort-pulse laser technology.

Previously, a solution of reducing complexity of CPA arrangement through the use of chirped volume Bragg gratings have been proposed, in order to overcome limited mode-area of chirped fiber Bragg grating compressors. However, no suitable method of achieving chirped volume gratings have been identified. In fact, experimental attempts to implement such gratings through UV-written photosensitive-glass gratings identified the main difficulty of achieving required performance. Due to the exponential decay of the writing-UV-beam intensity (due to writing-beam absorption during writing process) the resulting gratings are highly inhomogeneous in the depth direction, producing highly spatially distorted pulse-compressed beams. This, on one hand, severely limits the attainable volume-grating aperture size to no more than 100-300 µm, and, on the other hand, produces unacceptable beam quality loss.

Figure 1A:
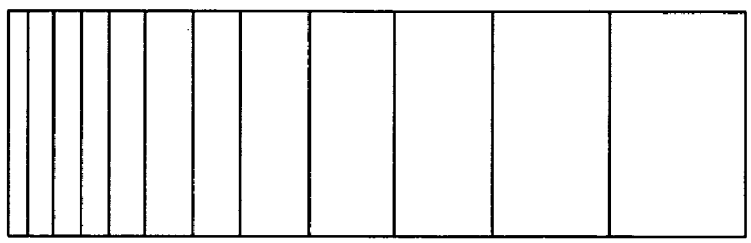
FIG. 1a shows a volume grating with spatial chirp.
Figure 1B:
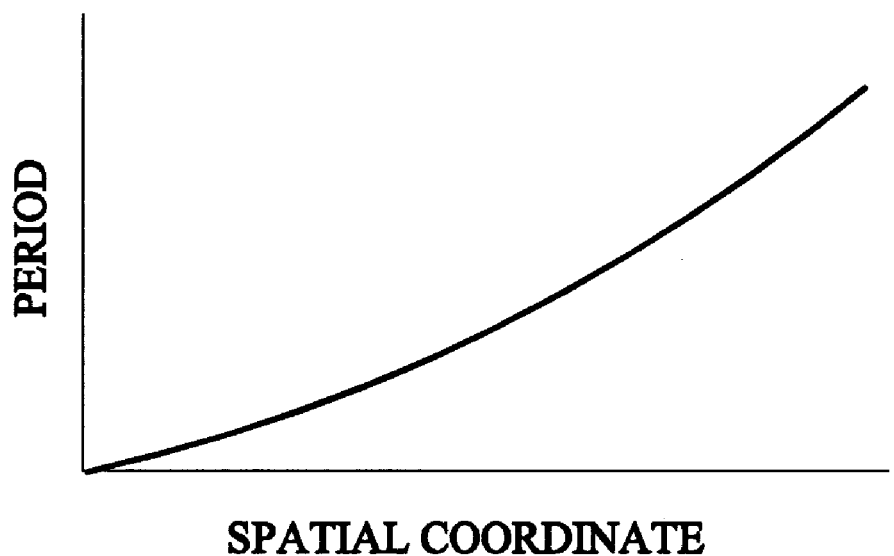

FIG. 1 shows the basic embodiment of chirped volume gratings when the grating period varies along the spatial axis. If illuminated by collimated polychromatic radiation (e.g. from the left side), the device reflects different wavelengths by its different parts. This device is considered as an infinite sum of gratings with different periods and, therefore, has a spectral profile produced by combination of spectral profiles of elementary uniform gratings. FIG. 1b is a graph of the spatial coordinates corresponding to the Bragg grating shown in FIG. 1a. This combination results in broadening of the spectral width of the grating and elimination of side lobes in the function of spectral selectivity. In a reflected beam, different spectral components are separated in the space because of reflection from different parts of a chirped grating.

To model a phase lossless volume grating with a spatial chirp Kogelnik's theory of coupled waves is combined with the F-matrix method. The matrix approach allows modeling of a grating with variable period as a sum of elementary gratings with constant periods. Therefore, to model a grating having a variable period, the grating is divided into n-segments of equal length. Each segment is set to have a constant period equal to its median value. F-matrix is calculated for each of the n-segments, and total matrix elements are calculated. Then, the reflection coefficient is calculated. Use of this model allows calculation of the reflection spectra of chirped gratings depending on grating parameters and, consequently, determining of optimal grating parameters for any specific spectral selection.

In this example, grating with linear dependence of period on a spatial coordinate are used. In this example, the chirp is described by a single parameter, the spatial chirp rate $d\Lambda/dz$. The grating period and the resonant wavelength of reflecting for the normal incidence are connected by a simple formula:

$$\lambda = 2n\Lambda \qquad \text{Equation 1}$$

Equation 1 allows replacing the spatial chirp rate by more practical parameter for spectral selection which is the spectral chirp rate:

$$d\lambda/dz = 2n \, d\Lambda/dz \qquad \text{Equation 2}$$

The parameter of equation 2 characterizes shift of resonant wavelength of a chirped grating per unit of its length.

Figure 2A:
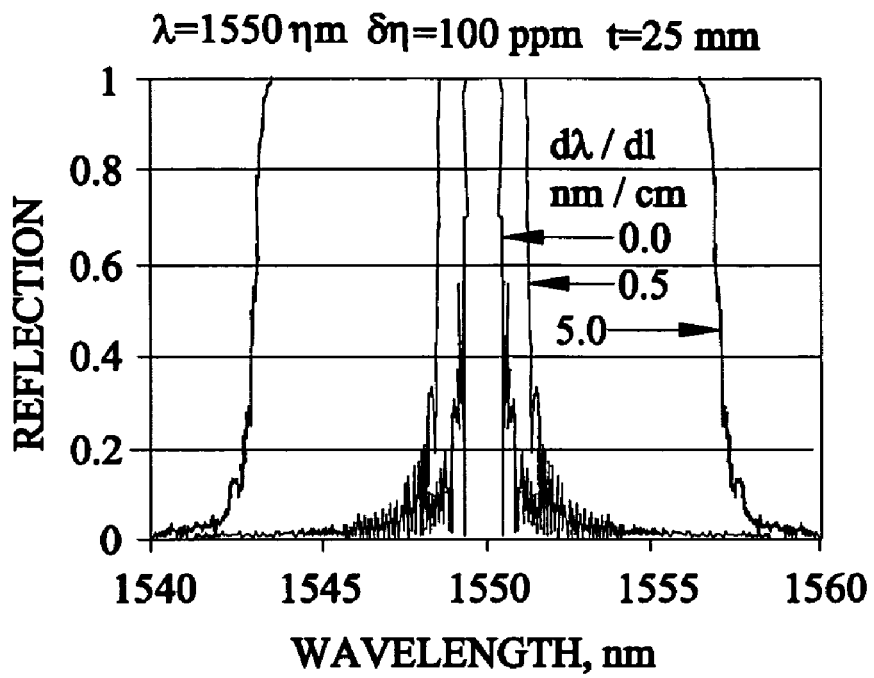
FIG. 2a shows an example of the spectral selectivity of reflective gratings with different chirp rates.
Figure 2B:
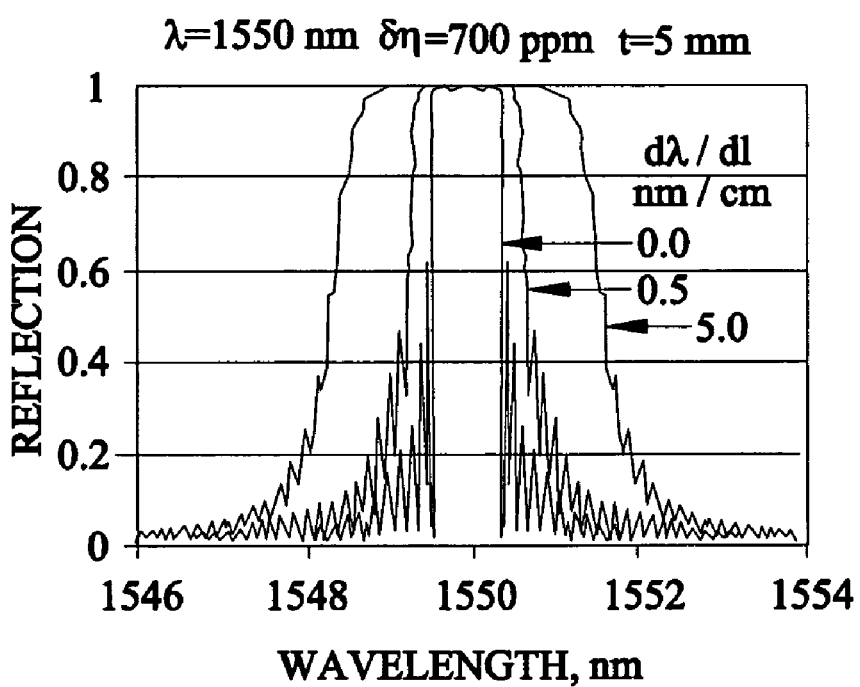
FIG. 2b shows another example of the spectral selectivity of reflective gratings with different chirp rates.

Spectral selectivity of chirped gratings with different spectral chirp rates is shown in FIGS. 2a and 2b compared to a uniform grating. One can see that variations of the grating period result in increasing of a spectral width of the filter with simultaneous decreasing of the side lobes. It is important that increasing of the spectral width of a uniform grating by increasing of a refractive index modulation results in increasing of side lobes. A very important feature of reflecting spectra of chirped gratings is flatness of top fraction of a spectral selectivity function. It should be noted that total spectral width of chirped grating is always higher compare to that of a uniform one. The developed model allows finding the grating parameters including period, refractive index modulation, thickness, and chirp rate that provide desirable spectral properties of a filter.

Figure 3:
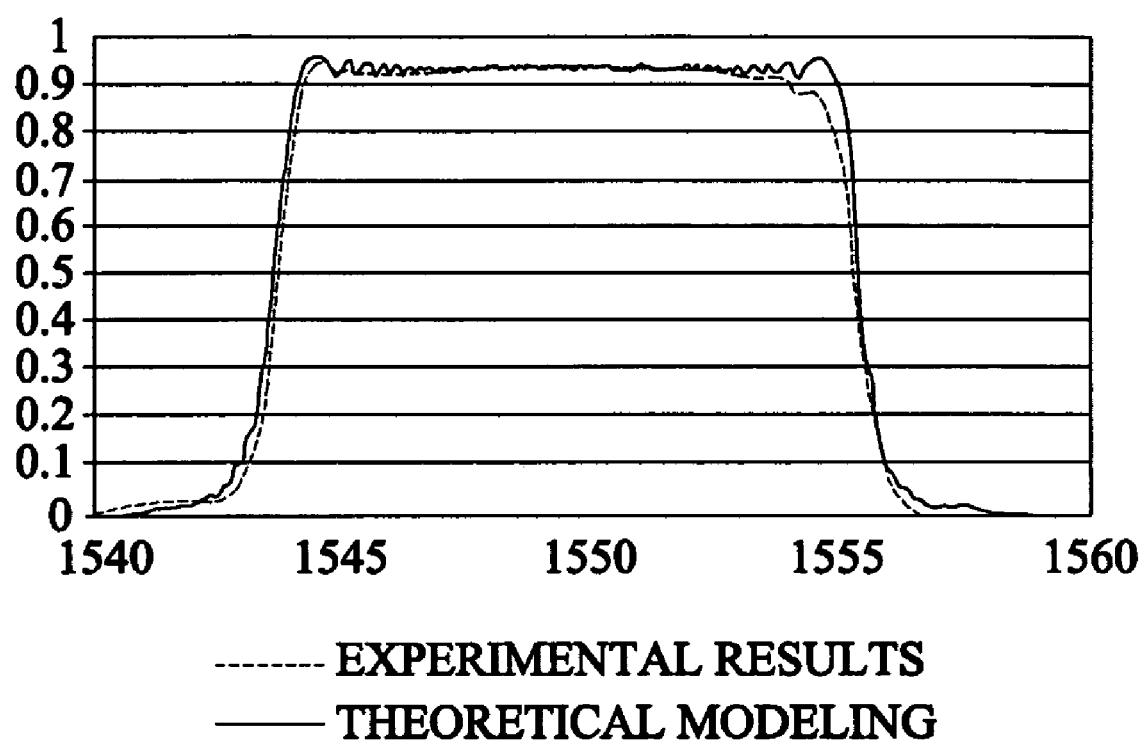
FIG. 3 shows theoretical (solid line) and experimental results (dashed line) of the spectral selectivity of reflecting Bragg grating in PTR glass.

To demonstrate advantages of high efficiency chirped gratings, an example was designed for 1550 nm with a spectral chirp rate of 7.5 nm/cm with a refractive index modulation of 800 ppm in a sample of 15 mm long. FIG. 3 shows comparison of modeling and experimental results. One can see that developed model predicts reflection spectrum with high accuracy. It is important that losses in this chirped grating with large thickness of 15 mm do not exceed 2%. It should be noted that this thick chirped Bragg grating has spectral width of 12 nm while conventional Bragg gratings of similar thickness have spectral width ranged below 1 nm.

Figure 4:
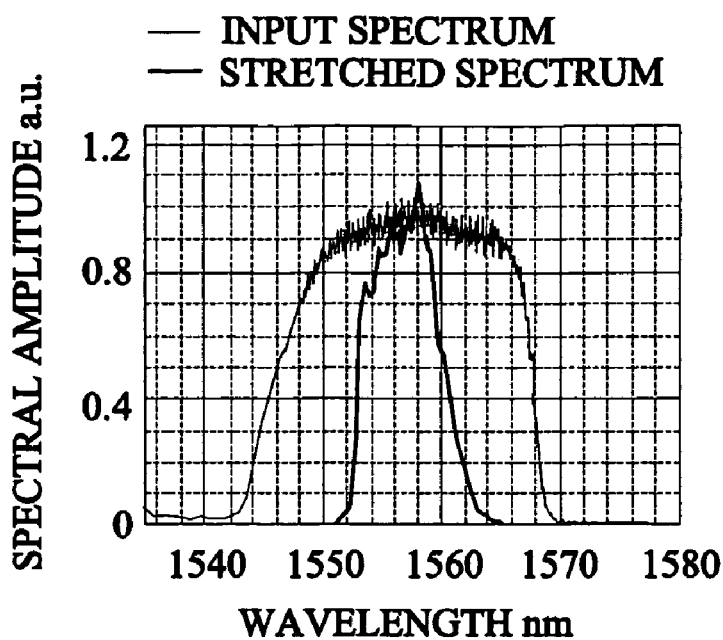
FIG. 4 shows the spectra of an incident laser pulse.
Figure 5:
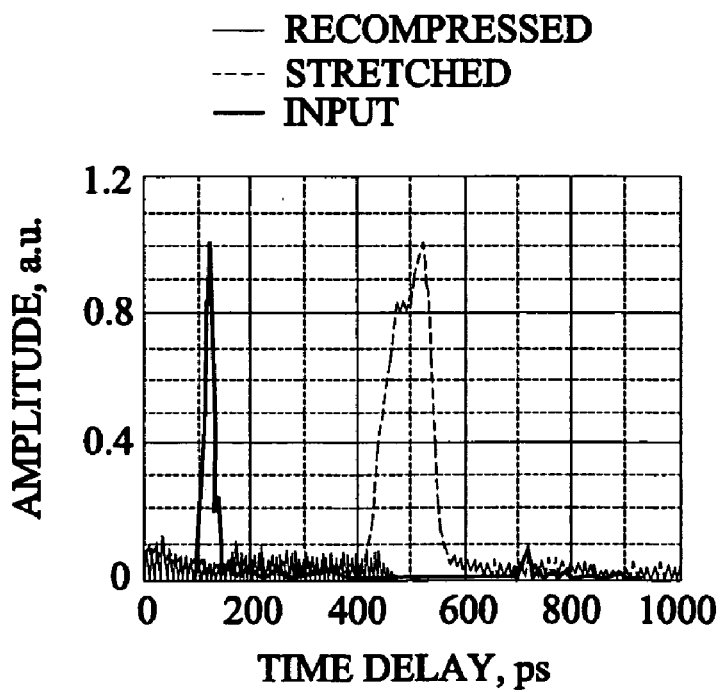
FIG. 5 shows duration of incident, stretched and re-compressed pulses reflected by a spectral chirp.

The following is an example using gratings according to the present invention with a femtosecond laser system operating at 1550 nm. Laser pulse of 180 fs with spectral width of 22 nm was directed along the grating vector perpendicular to planes of constant refractive index, which is from left to right in FIG. 1, of gratings having spectral chip rate of 7.5 nm/cm and thickness of 10 mm. The reflected beam had spectral width of 7 nm which corresponds to that observed with measurements by CW low power laser radiation as shown in FIG. 4. Referring to FIG. 5, it is important that the width of the reflected pulse increased up to 100 ps, which corresponds to the delay for two passes in 10-mm-thick glass slab with refractive index about 1.5.

Stretched chirped pulses were subsequently launched into the grating from the opposite direction and were recompressed back to the femtosecond duration. Efficiency of stretching and compression achieved 95% constituting a major improvement over the efficiency of diffraction-grating pair based pulse compressors. What is even more important is that laser damage threshold of PTTR Bragg gratings exceeds $10^{11}$ W/cm$^2$ for pulse width in the range of 100 fs. This means that the apparatus, methods, systems and devices of the present invention enables increasing of power of femtosecond lasers while size and weight of the devices would be decreased.

In summary, the present invention teaches how to fabricate stretchers and compressors for ultrashort laser pulses with high efficiency, high laser-induced damage threshold, and protected from misalignment by means of recording of high efficiency volume gratings with variable period (chirped) in PTR glass. The present invention enables creation of a new generation of high power femtosecond laser systems.

The main approach of the present invention is a combination of properties of high efficiency volume Bragg gratings in PTR glass which allow achieving very large sizes (tens of millimeters) of both transverse apertures and in-depth direction with highly homogeneous spatial grating profile, and ideology of stretching and compression of short pulses for power amplification by chirped fiber gratings. This overcomes the principal limitations of the known art by providing the unique properties of gratings recorded inside PTR glass which enable creation of very large apertures with homogeneous transverse spatial profile, thus eliminating any significant beam distortions and allowing to scale pulse energies into multi-mJ energy range and higher. Furthermore, the intrinsic ability of PTR glass to withstand high average laser powers (our recent tests indicated no damage for 0.5-kW laser power focused into 350-um diameter spot in PTR glass) provides a unique method of implementing high power (from 100 W to multi-kilowatt level) femtosecond technology, which has not been attainable with any other previously demonstrated compressor technology.

High power lasers including solid state, fiber, and semiconductor ones with diffraction limited divergence and stable wavelength are now possible with the teachings of this invention. Such devices will find great applications in military laser systems, optical communication, remote sensing, laser technology, e.g. cutting, welding, drilling, etc.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A diffractive optical element comprising:
   a photo-thermal-diffractive element having an absolute diffraction efficiency exceeding 95%; and
   chirped Bragg gratings recorded in said photo-thermal-diffractive element for stretching and compressing of short laser pulses with high efficiency for power amplification.

2. The diffractive optical element of claim 1, wherein said chirped Bragg gratings comprise:
   plural Bragg grating with a spatial chirp wherein the spatial chirp grating period varies along a spatial axis for broadening of spectral width and decreasing spectral selectively side lobes for fine spectral filtering.

3. The diffractive optical element of claim 2, further comprising:
   a laser beam having short laser pulses dirceted from a first side to a second side of the diffractive optical element for stretching the short laser pulses.

4. The diffractive optical element of claim 2, further comprising:
   a laser beam having short laser pulses directed from second side to said first side of the diffractive optical element for compression of the short laser pulses.

5. The diffractive optical element of claim 1, further comprising:
   a femtosecond laser having ultrashort laser pulse output;
   an external resonator laser incorporating said photo-thermal-diffractive glass with said chirped Bragg gratings coupled with said femtosecond laser for stretching and compressing of the ultrashort laser pulses for power amplification with a high laser-induced damage threshold and protection from misalignment.

6. A method for power amplification of short laser pulses comprising the steps of:
   providing a photo-thermal-diffractive element having an absolute diffraction efficiency exceeding 95%; and
   recording chirped Bragg grating in said photo-thermal-diffractive element to produce a high efficiency diffractive element, wherein the chirped Bragg gratins vary along a spatial element for controlling spectral selectivity and stretching and compressing short laser pulses.

7. The method of claim 6, wherein said recording step comprises the step of:
   recording plural grating with spatial chirps having different periods, each of said plural gratings having a spectral profile, wherein the spectral profile of the high efficiency diffractive element is the sum of the spectral profiles from the plural gratings.

8. The method of claim 7, further comprising the step of:
   applying a laser beam having short pulses from a first side to a second side of the optical element to cause reflection of the beam at different angles, wherein a change in the spatial chirp results in stretches and compresses the short pulses for power amplification.

9. The method of claim 6, further comprising the step of:
   applying the high efficiency diffractive element to a laser to control the spectral and angular parameters of the laser, wherein the laser is selected from a group including solid state, semiconductor, liquid and gas lasers that omit in the window of transparency of the photo-thermal-diffractive glass.

10. The method of claim 6, further comprising the steps of:
    providing a femtosecond laser device having short pulse output; and
    using said high efficiency diffractive element for stretching and compressing the short pulses for power amplification.

* * * * *